United States Patent
Renner

(10) Patent No.: US 11,353,091 B2
(45) Date of Patent: Jun. 7, 2022

(54) DRIVE ARRANGEMENT FOR A VEHICLE AND METHOD TO PERFORM GEAR CHANGES

(71) Applicant: ZF Friedrichshafen AG, Friedrichshafen (DE)

(72) Inventor: Stefan Renner, Bodman-Ludwigshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 16/953,617

(22) Filed: Nov. 20, 2020

(65) Prior Publication Data

US 2021/0164544 A1  Jun. 3, 2021

(30) Foreign Application Priority Data

Nov. 28, 2019 (DE) ...................... 10 2019 218 413.8

(51) Int. Cl.
*F16H 3/66* (2006.01)
*F16H 3/44* (2006.01)

(52) U.S. Cl.
CPC ............. *F16H 3/666* (2013.01); *F16H 3/663* (2013.01); *F16H 2003/442* (2013.01); *F16H 2200/2007* (2013.01); *F16H 2200/2097* (2013.01)

(58) Field of Classification Search
CPC .... F16H 3/666; F16H 3/663; F16H 2003/442; F16H 2200/2007; F16H 2200/2097
See application file for complete search history.

(56) References Cited

U.S. PATENT DOCUMENTS

| 4,569,252 A | * | 2/1986 | Harper | ...................... | F16H 3/78 |
| | | | | | 475/299 |
| 6,305,518 B1 | * | 10/2001 | Buri | ........................ | F16D 23/06 |
| | | | | | 192/114 T |

(Continued)

FOREIGN PATENT DOCUMENTS

| DE | 10 2013 226 474 A1 | 6/2015 |
| DE | 10 2014 213 012 A1 | 1/2016 |

(Continued)

OTHER PUBLICATIONS

German Search Report Corresponding to 10 2019 218 413.8 dated Jun. 17, 2020.

*Primary Examiner* — Tinh Dang

(74) *Attorney, Agent, or Firm* — Finch & Maloney PLLC; Michael J. Bujold; Jay S. Franklin

(57) ABSTRACT

Electric vehicle drive arrangement having input and output shafts (EW, AW) and a change-speed transmission (G). The transmission (G) has two planetary gearsets (PS1, PS2) and first, second and third shifting elements (SE1, SE2, SE3) for engaging first, second and third gears (G1, G2, G3). The first planetary gearset (PS1) comprises a first sun shaft (SO1), a first ring gear shaft (HR1) and a first carrier shaft (ST1). The second planetary gearset (PS2) comprises a second sun shaft (SO2), a second ring gear shaft (HR2) and a second carrier shaft (ST2). The first carrier shaft (ST1) is connected to the second ring gear shaft (HR2), and the first sun shaft (SO1) forms the transmission input shaft (EW). The second carrier shaft (ST2) forms the transmission output shaft (AW). The first shifting element engages first gear, the second shifting element engages second gear and the third shifting element engages third gear.

14 Claims, 5 Drawing Sheets

(56) References Cited

U.S. PATENT DOCUMENTS

| | | | |
|---|---|---|---|
| 6,514,170 B1* | 2/2003 | Kao .......................... | F16H 3/66 475/296 |
| 8,210,981 B2* | 7/2012 | Bauknecht ................ | F16H 3/66 475/275 |
| 8,231,501 B2* | 7/2012 | Gumpoltsberger ....... | F16H 3/66 475/284 |
| 10,145,453 B2* | 12/2018 | Lippert .................... | F16H 3/66 |
| 10,753,430 B2* | 8/2020 | Rippelmeyer ............ | F16H 3/46 |
| 2012/0115672 A1* | 5/2012 | Gumpoltsberger ....... | F16H 3/66 475/276 |
| 2015/0152960 A1* | 6/2015 | Haug ................. | F16H 61/0403 477/86 |
| 2017/0059023 A1* | 3/2017 | Severinsson ....... | B60K 17/3462 |
| 2017/0204942 A1* | 7/2017 | Iuchi ....................... | B61C 9/00 |
| 2020/0282827 A1 | 9/2020 | Kaltenbach et al. | |

FOREIGN PATENT DOCUMENTS

| | | |
|---|---|---|
| DE | 10 2016 206 026 A1 | 10/2017 |
| DE | 10 2019 202 994 A1 | 9/2020 |
| WO | 2012/082380 A1 | 6/2012 |

* cited by examiner

DRIVE ARRANGEMENT FOR A VEHICLE AND METHOD TO PERFORM GEAR CHANGES This application claims priority from German patent application serial no. 10 2019 218 413.8 filed Nov. 28, 2019.

FIELD OF THE INVENTION

The invention relates to a drive arrangement of a vehicle and to a method for carrying out gearshifts.

BACKGROUND OF THE INVENTION

In the older application with file number 10 2019 202 994.9 a drive unit for an electronic vehicle with an electric machine and a three-step or two-step change-speed transmission is disclosed, in which a shifting device with three or two shifting elements for engaging three or two gears is provided. By omitting one shifting element the three-gear transmission can be used as a two-gear transmission. The transmission has two planetary gearsets coupled to one another, such that the first planetary gearset is driven by way of its sun shaft (the transmission input shaft) by the electric machine, while the ring gear of the first planetary gearset is held fixed. The first planetary gearset is coupled by way of its carrier shaft to the ring gear of the second planetary gearset. The carrier shaft of the second planetary gearset forms the transmission output shaft. The three, or two shifting elements are integrated in a sliding sleeve which can move axially on the sun shaft of the second planetary gearset, so that for the three-gear transmission there are a total of five positions, namely three shifting positions and two neutral positions. In the older application a drive axle with drive wheels is also disclosed, in which the drive unit serves as the drive input and drives an axle differential arranged between the drive wheels. The transmission output shaft of the drive unit is thus connected to the differential input, the differential cage. With this drive axle, which comprises only one electric drive machine, only one change-speed transmission and one axle differential, powershifts are not possible. Due to the shifting elements, which are in the form of claws, the shifts take place with traction force interruption.

SUMMARY OF THE INVENTION

The purpose of the present invention is to propose a drive arrangement which has three gears, in order thereby to be able to meet various vehicle demands relating to torque and drive power. The invention comprises the characteristics specified in the independent claims. Advantageous design features emerge from the subordinate claims.

A drive arrangement for a vehicle with a change-speed transmission having a transmission input shaft and a transmission output shaft is proposed, the transmission being designed as a three-gear transmission for engaging a first gear, a second gear and a third gear, and comprising a first shifting element, a second shifting element and a third shifting element and two planetary gearsets coupled to one another. The first planetary gearset comprises a first sun shaft, a first ring gear shaft and a first carrier shaft, whereas the second planetary gearset comprises a second sun shaft, a second ring gear shaft and a second carrier shaft. The first carrier shaft is permanently connected to the second ring gear shaft. The first sun shaft forms the transmission input shaft. The second sun shaft is held fast on the housing. The second carrier shaft forms the transmission output shaft. To engage the first gear the first shifting element can be actuated. To engage the second gear the second shifting element can be actuated, and to engage the third gear the third shifting element can be actuated.

By means of the first shifting element the first ring gear shaft can be coupled to the housing. By means of the second shifting element the first ring gear shaft can be coupled to the second carrier shaft.

The first planetary gearset is or can be blocked by actuating the third shifting element, whereby the first ring gear shaft can be coupled to the first sun shaft or transmission input shaft, or whereby the first ring gear shaft can be coupled to the first carrier shaft.

The shifting elements can be in the form of disk clutches or unsynchronized claw clutches. Also, the first and second shifting elements can be in the form of claw clutches and the third shifting element only in the form of a disk clutch.

In this case the shifting elements can be single shifting elements, or two of the shifting elements can be combined in a double shifting element. A triple shifting element, in which the first, second and third shifting elements are actuated by a sliding sleeve, is also possible. Preferably, the sliding sleeve of the double shifting element or the triple shifting element is arranged and able to move on the first ring gear shaft.

A method is also proposed for carrying out shifts under load by means of the first, second and third shifting elements of the change-speed transmission, for an upshift under traction from the first gear to the second gear. In this case, in the first gear the first shifting element is closed and the second and third shifting elements are open. The third shifting element is closed with slip until the first shifting element becomes free from load and is opened. Thereafter the third shifting element is closed farther until the second shifting element is synchronized and can be closed. After that, the third shifting element can be opened again.

To upshift from the second to the third gear, the second shifting element being closed in the second gear whereas the first and third shifting elements are open, the third shifting element is closed with slip until the second shifting element becomes free from load and is opened. Thereafter, the third shifting element is closed completely.

When a double shifting element is used, the open position of the first shifting element and the open position of the second shifting element provide neutral positions of the double shifting element.

Actuation can take place by means of ball ramps actuated by electric motor.

BRIEF DESCRIPTION OF THE DRAWINGS

Example embodiments of the invention are illustrated in the drawings and will be described in greater detail below, so that further features and/or advantages may emerge from the description and/or the drawings, which show.

DETAILED DESCRIPTION OF THE PREFERRED EMBODIMENTS

Figures 1, 2:
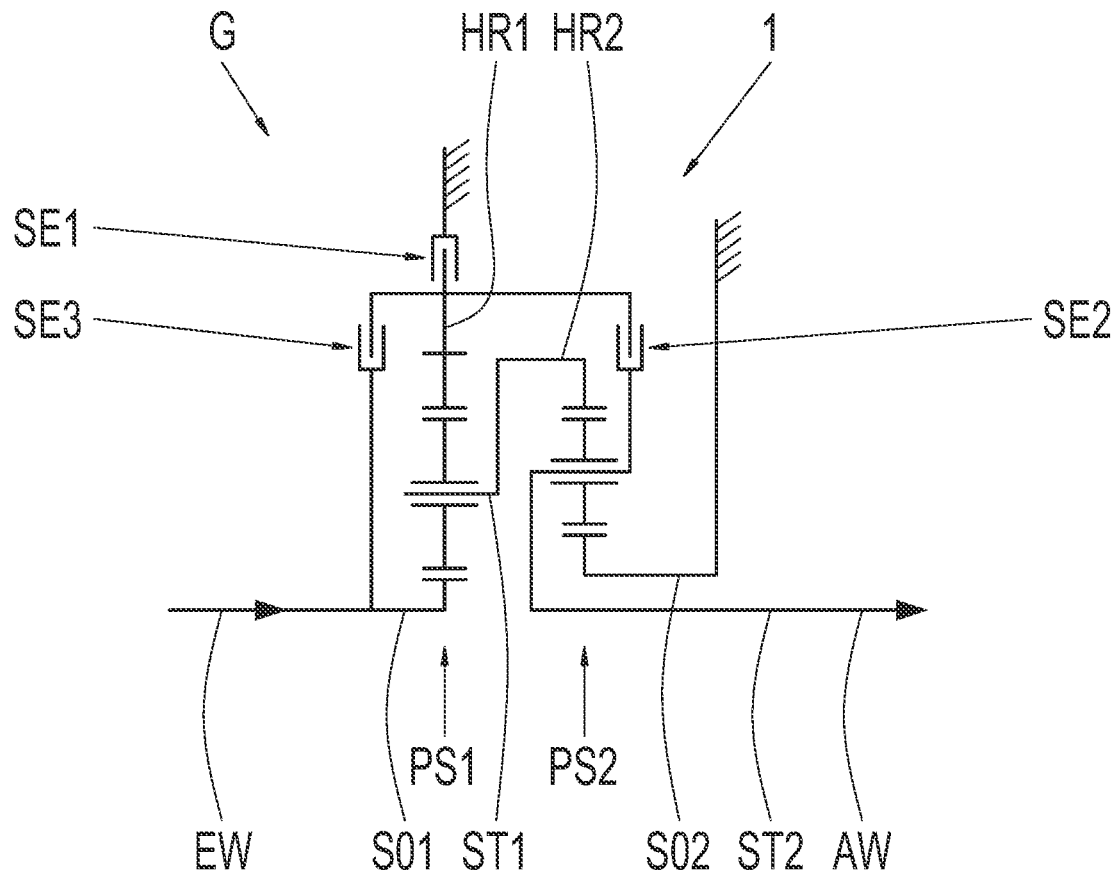
FIG. 1: A first drive arrangement in the form of a central drive—with three shifting elements, fully powershiftable
FIG. 2: Shifting scheme for the first drive arrangement

As a first example embodiment of the invention, FIG. 1 shows a first drive arrangement 1 of an electrically powered vehicle, in the form of a so-termed central drive. Central drives are advantageous because they can be integrated relatively simply into a conventional drive-train. The drive arrangement 1 comprises a transmission G, which can be connected to a drive input in the form of an electric drive and which can drive a vehicle axle by way of a transmission output shaft AW. This can be a conventional vehicle axle with a first and a second drive wheel, an axle differential and two differential output shafts which drive the drive wheels. In this case the transmission output shaft AW is drive-connected to the axle differential, which can distribute the power to the two drive wheels. The change-speed transmission G is in the form of a three-gear transmission for engaging a first gear G1, a second gear G2 and a third gear G3. To engage the three gears G1, G2, G3 the transmission G is constructed with a first shifting element SE1, a second shifting element SE2, a third shifting element SE3 and two mutually coupled planetary gearsets PS1 and PS2. The shifting elements SE1 to SE3 are preferably in the form of disk clutches or disk brakes. Thus, the transmission G is fully powershiftable. In addition it is advantageous if the shifting elements SE1 to SE3 are arranged on the outside. In that way an alternative actuation mode, for example by means of ball ramps actuated by electric motor, is enabled in a simple manner. The first planetary gearset PS1 comprises a first sun shaft SO1, a first ring gear shaft HR1 and a first carrier shaft ST1, while the second planetary gearset PS2 comprises a second sun shaft SO2, a second ring gear shaft HR2 and a second carrier shaft ST2. The first carrier shaft ST1 is connected permanently to the second ring gear shaft HR2. The first sun shaft SO1 forms the transmission input shaft EW. The second sun shaft SO2 is held fast onto the housing, the housing being indicated by hatching. The second carrier shaft ST2 forms the transmission output shaft AW. The first planetary gearset PS1 is arranged spatially adjacent to the second planetary gearset PS2, with the first planetary gearset PS1 arranged on the drive input side toward the input shaft EW and the second planetary gearset PS2 on the output side toward the output shaft AW.

FIG. 2 shows an associated shifting scheme for FIG. 1 including a preferred gear ratio, while further gear ratios are possible in accordance with the vehicle's needs. The dot in each line shows which of the shifting elements SE1 to SE3 has to be actuated in order to engage the respective gears G1 to G3. To engage the first gear G1, the first shifting element SE1 can be actuated. Preferably, a gear ratio i=6 is provided. By means of the first shifting element SE1 the first ring gear shaft HR1 is held fixed on the housing. To engage the second gear G2, the second shifting element SE2 can be actuated. Preferably, for this gear a gear ratio i=3 is provided. By actuating the second shifting element SE2 the first ring gear shaft HR1 is connected to the second carrier shaft ST2. To engage the third gear G3, the third shifting element SE3 can be actuated. Preferably, for this gear a gear ratio i=1.5 is provided. With the third shifting element SE3 actuated, the first ring gear shaft HR1 is connected to the first sun shaft SO1 or the input shaft EW. By connecting two of the three components (HR1, SO1, ST1) of the first planetary gearset PS1, the first planetary gearset PS1 is blocked. The gear ratio values shown in FIG. 2 are obtained with the chosen standard gear ratios iG10 −3 or iG2=−2. The gear interval from the first gear G1 to the second gear G2 and from the second gear G2 to the third gear G3 is thus constant, at 2.0.

Figures 3, 4:
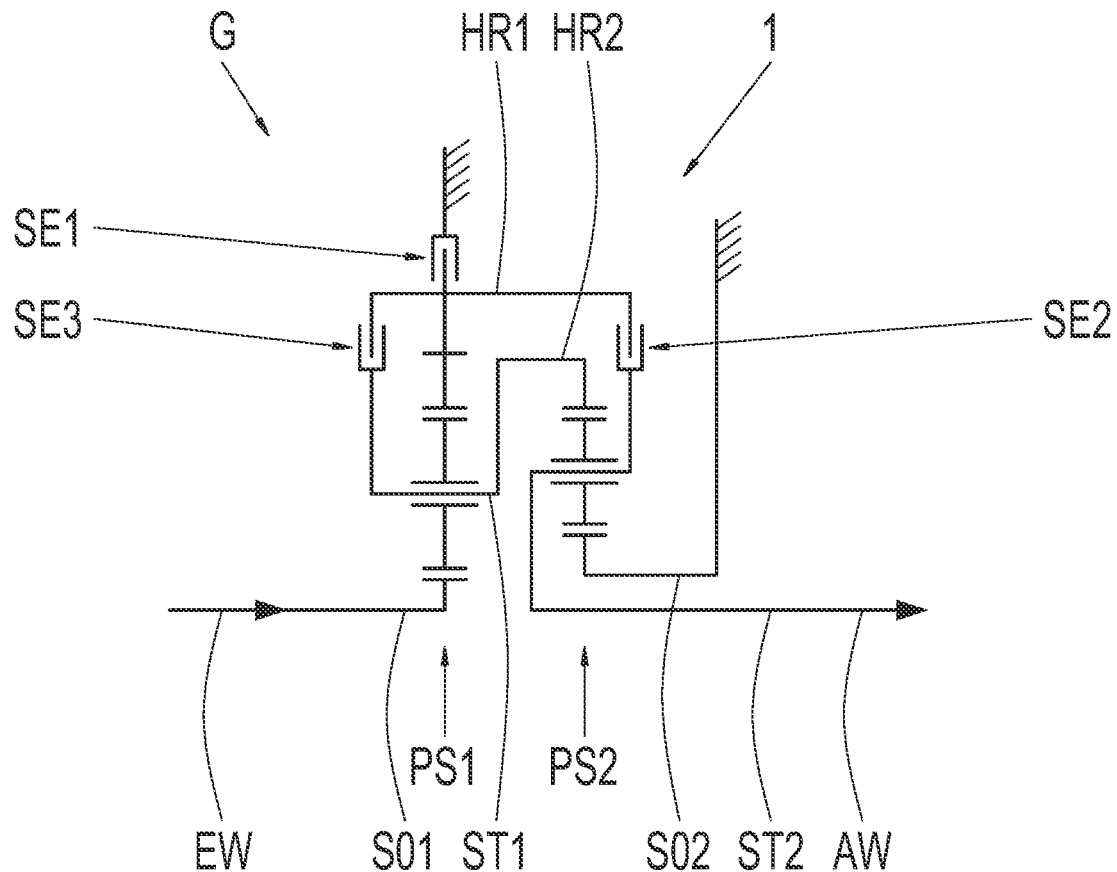
FIG. 3: A second drive arrangement in the form of a central drive—with three shifting elements, fully powershiftable
FIG. 4: Shifting scheme for the second drive arrangement

FIG. 3 shows a second embodiment of the drive arrangement 1. In this case, for the powershift process the third shifting element can be designed such that with the same functionality it can produce a coupling of the first carrier shaft ST1 to the first ring gear shaft HR1. In this second example embodiment the other characteristics are analogous to the first example embodiment.

In FIG. 4 the shifting scheme associated with the second embodiment is shown. From this it can be seen that in the shifting system for engaging the gears G1 to G3, compared with the first example embodiment nothing is changed by the modification at the third shifting element SE3. Only, the third shifting element SE3 does not connect the first ring gear shaft HR1 to the first sun shaft SO1. In the second example embodiment the third shifting element SE3, when actuated, connects the first ring gear shaft HR1 to the first carrier shaft ST1, whereby, however, the third gear G3 is obtained again.

Figures 5, 6:
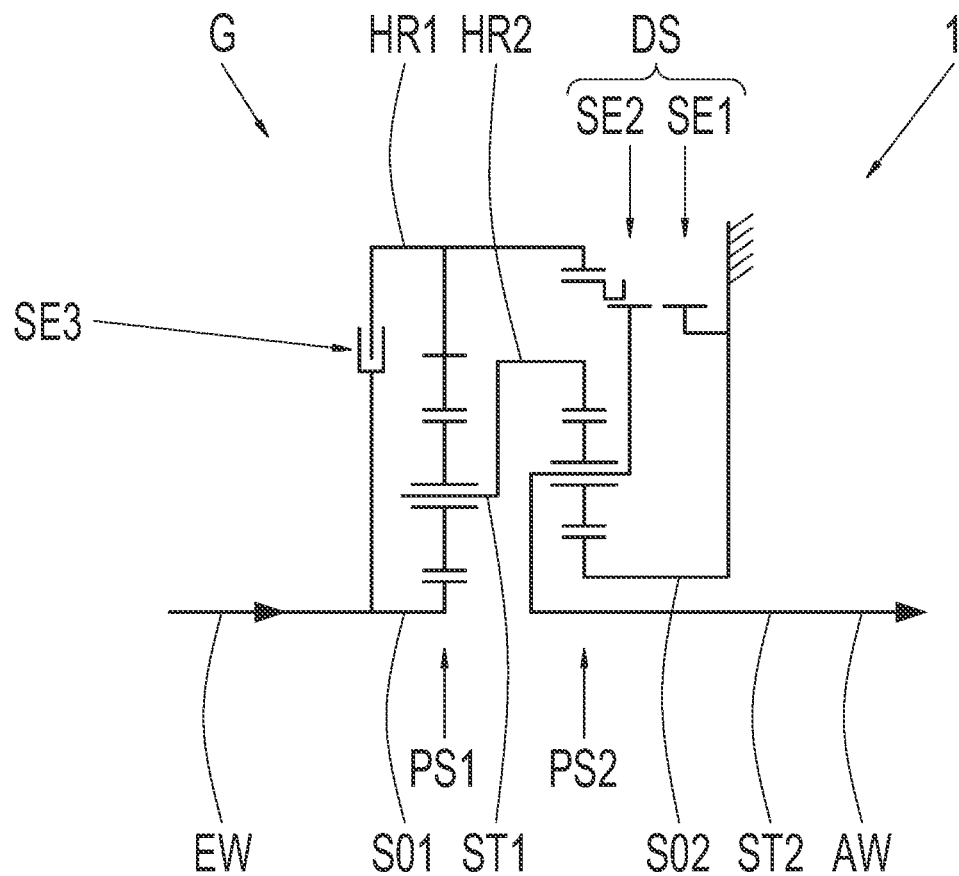
FIG. 5: A third drive arrangement in the form of a central drive—with a single shifting element and a double shifting element, partially powershiftable
FIG. 6: Shifting scheme for the third drive arrangement

FIG. 5 shows a third embodiment. The drive arrangement 1 comprises a transmission G which via a transmission input shaft EW can be connected to a drive input, in particular in the form of an electric drive, and can drive a vehicle axle via a transmission output shaft AW. The transmission G is again designed as a three-gear transmission for engaging a first gear G1, a second gear G2 and a third gear G3. To engage these three gears G1 to G3 the transmission G comprises a first shifting element SE1, a second shifting element SE2, a third shifting element SE3, and two planetary gearsets PS1 and PS2 coupled to one another. In this case the first and second shifting elements SE1 and SE2 are in the form of a double shifting element DS. The two shifting elements SE1 and SE2 are combined to form a double-sided shifting element DS. The first shifting element SE1 is closed when the double-sided shifting element is in its right-hand switching position and the second shifting element SE2 is closed when the double-sided shifting element is in its left-hand position. A neutral position can also be engaged in which neither of the two shifting elements SE1 and SE2 is closed. The third shifting element SE3 is preferably in the form of a disk clutch or a disk brake, whereas the first and second shifting elements SE1, SE2 can be claw-type shifting elements. Furthermore, it is advantageous for the shifting elements SE1 to SE3 to be arranged on the outside. In that way an alternative actuation mode, for example by means of electric motor actuated ball ramps, is made possible in a simple manner. The first planetary gearset PS1 again companies a first sun shaft SO1, a first ring gear shaft HR1 and a first carrier shaft ST1, whereas the second planetary gearset PS2 comprises a second sun shaft SO2, a second ring gear shaft HR2 and a second carrier shaft ST2. The first sun shaft SO1 is permanently connected to the second ring gear shaft HR2. The first sun shaft SO1 forms the transmission input shaft EW. The second sun shaft SO2 is held fast on the housing. The second carrier shaft ST2 forms the transmission output shaft AW. The first planetary gearset PS1 is spatially adjacent to the second planetary gearset PS2 on the drive input side toward the input shaft EW, and the second planetary gearset PS2 is on the output side toward the output shaft AW. This variant is partially powershiftable, which compared with the fully powershiftable variant with three individual shifting elements SE1 to SE3 has the advantage of occupying less space. In the main driving gear, the third gear G3, the third shifting element SE3 is closed so that no drag torques are produced in the disks.

FIG. 6 shows a shifting scheme associated with FIG. 5. To engage the first gear G1 the double shifting element DS is in its right-hand position so that the first shifting element SE1 is actuated. By actuating the first shifting element SE1 the first ring gear shaft HR1 is moreover held fast on the housing. To engage the second gear G2, the double shifting element DS is in its left-hand position so that the second shifting element SE2 is actuated. By actuating the second shifting element SE2 a connection is also formed between the first ring gear shaft HR1 and the second carrier shaft ST2. To engage the third gear G3, the third shifting element SE3 is actuated. The third shifting element SE3 can connect the first ring gear shaft HR1 to the first sun shaft SO1.

To carry out a traction upshift from the first gear G1 to the second gear G2, the following steps must be carried out:

The first shifting element SE1 is closed, in that the double shifting element DS is moved to its right-hand shifting position. The third shifting element SE3 and the second shifting element SE2 are open.

The third shifting element SE3 closes with slip and takes up torque until the double shifting element DS and the first shifting element SE1 are free from load.

The double shifting element DS is now shifted to neutral. Thus, the first shifting element SE1 is opened.

The third shifting element SE3 closes farther until at the double shifting element DS in its left-hand shifting position, or at the second shifting element SE2, approximate co-rotation with the shaft to be connected is produced.

Then, the double shifting element DS is shifted to its left-hand switching position and the second shifting element SE2 is closed.

The third shifting element SE3 is opened again.

To carry out a traction upshift from the second gear G2 to the third gear G3 the following steps must be carried out:

The second shifting element SE2 is closed, in that the double shifting element DS is shifted to its left-hand position. The third and first shifting elements SE3, SE1 are open.

The third shifting element SE3 closes with slip and takes up torque until the double shifting element DS and the second shifting element S2 are free from load.

The double shifting element DS is now shifted to neutral and the first shifting element SE1 opens.

The third shifting element SE3 is closed completely.

Downshifts take place analogously but in the reverse sequence.

Figures 7, 8:
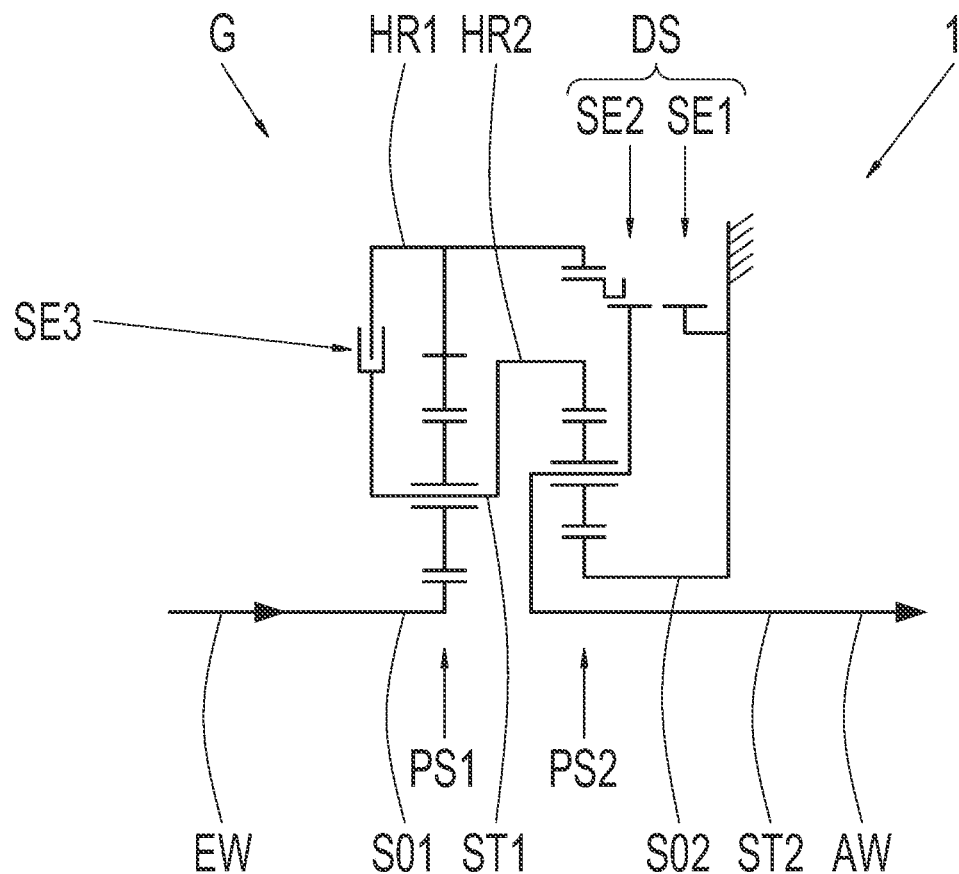
FIG. 7: A fourth drive arrangement in the form of a central drive—with a single shifting element and a double shifting element, partially powershiftable
FIG. 8: Shifting scheme for the fourth drive arrangement

FIG. 7 shows a fourth embodiment of the drive arrangement 1. In this case, for the powershift process the third shifting element can be designed such that with the same functionality, it can produce a connection between the first carrier shaft ST1 and the first ring gear shaft HR1.

FIG. 8 shows the shifting scheme associated with the fourth embodiment. From this it can be seen that compared with the third example embodiment, despite the modification of the third shifting element SE3, the shifting system for engaging the gears G1 to G3 is no different.

Figures 9, 10:
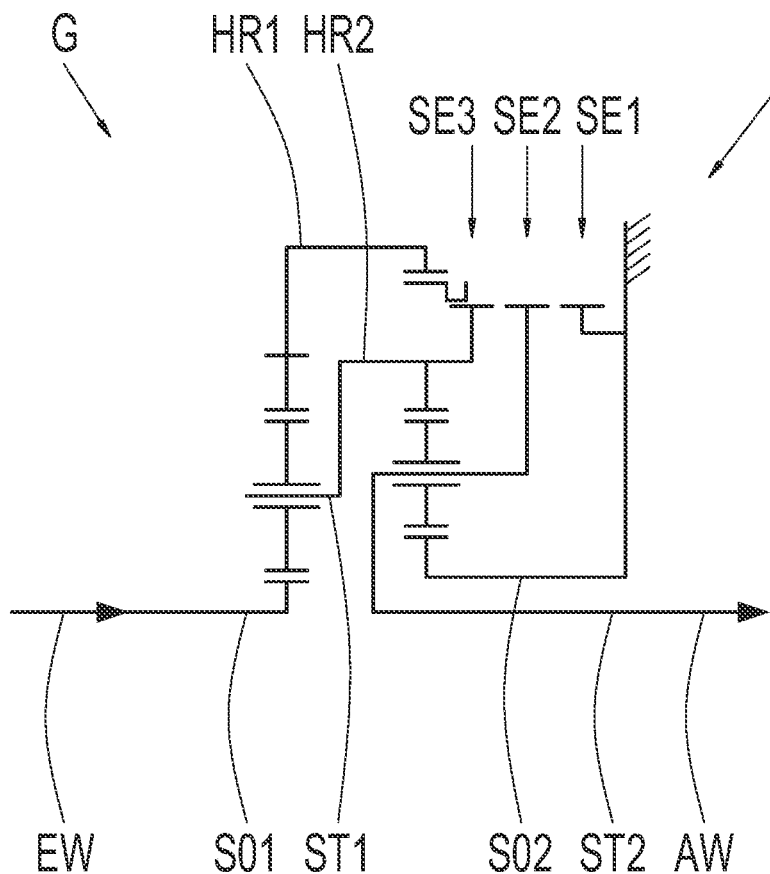
FIG. 9: A fifth drive arrangement in the form of a central drive—with a triple shifting elements, with traction force interruption
FIG. 10: Shifting scheme for the fifth drive arrangement

FIG. 9 shows a fifth embodiment. The drive arrangement 1 comprises a transmission G, which can be connected to a drive input, in particular in the form of an electric drive by way of a transmission input shaft EW, and which can drive a vehicle axle by way of a transmission output shaft AW. The transmission G is again in the form of a three-gear change-speed transmission for engaging a first gear G1, a second gear G2 and a third gear G3. To engage these three gears G1 to G3, the transmission G has a first shifting element SE1, a second shifting element SE2, a third shifting element S3 and two planetary gearsets PS1 and PS2 coupled with one another. In this case the first shifting element SE1, the second shifting element SE2 and the third shifting element SE3 form a triple shifting element. Thus, all the shifting elements SE1 to SE3 are combined in one shifting element with three shift positions. The first shifting element SE1 is closed when the triple shifting element is in its first, right-hand position, and the second shifting element SE2 is closed when the triple shifting element is in its central, second position. The third shifting element SE3 is closed when the triple shifting element is its left-hand, third shift position. At least one neutral position can also be engaged, in which none of the three shifting elements SE1 to SE3 is closed. Preferably two neutral positions can be engaged, a first neutral position between the first and second shifting elements SE1 and SE2 and a second neutral position between the second and third shifting elements SE2 and SE3. The shifting elements SE1, SE2, SE3 are preferably in the form of claw-type shifting elements. In addition it is advantageous for the shifting elements SE1 to SE3 to be arranged on the outside. In that way an alternative actuation mode, for example by means of ball ramps actuated by electric motor, is enabled in a simple manner. The first planetary gearset PS1 again comprises a first sun shaft SO1, a first ring gear shaft HR1 and a first carrier shaft ST1, and the second planetary gearset PS2 comprises a second sun shaft SO2, a second ring gear shaft HR2 and a second carrier shaft ST2. The first carrier shaft ST1 is connected permanently to the second ring gear shaft HR2. The first sun shaft SO1 forms the transmission input shaft EW. The second sun shaft SO2 is held fast on the housing. The second carrier shaft ST2 forms the transmission output shaft AW. The first planetary gearset PS1 is spatially arranged next to the second planetary gearset PS2, with the first planetary gearset PS1 on the drive input side toward the input shaft EW and the second planetary gearset PS2 on the drive output side, toward the output shaft AW.

As shown, the first ring gear shaft HR1 of the first planetary gearset PS1 is involved in all three shift positions—and therefore all the shifting elements, i.e. the first, second and third shifting element SE1, SE2, SE3 can be integrated in a single sliding sleeve which in all the shifting positions is connected rotationally fixed to the first ring gear shaft HR1. The sliding sleeve can be actuated by a single actuator. Since the gears one to three, G1 to G3, can be engaged one after another by moving the sliding sleeve in one direction, respectively across neutral positions, it is possible to synchronize the shifting elements.

FIG. 10 shows an associated shifting scheme for FIG. 9. To engage the first gear G1, the triple shifting element is in its right-hand shifting position so that the first shifting element SE1 is actuated. To engage the second gear G2, the triple shifting element is in its central shifting position so that the second shifting element SE2 is actuated. To engage the third gear G3, the triple shifting element is shifted to its left-hand position, so that the third shifting element SE3 is actuated. By means of the first shifting element S1 the first ring gear shaft HR1 is again held fast on the housing. The second shifting element SE2, when actuated, can again connect the first ring gear shaft HR1 to the second carrier shaft ST2, and the third shifting element SE3 can be actuated to connect the first ring gear shaft HR1 to the first carrier shaft ST1.

INDEXES

1 Drive arrangement
G Change-speed transmission
SE1 First shifting element
SE2 Second shifting element
SE3 Third shifting element
G1 First gear
G2 Second gear
G3 Third gear
AW Transmission output shaft
EW Transmission input shaft
PS1 First planetary gearset
PS2 Second planetary gearset
HR1 First ring gear shaft (PS1)
HR2 Second ring gear shaft (PS2)
SO1 First sun shaft (PS1)
SO2 Second sun shaft (PS2)
ST1 First carrier shaft (PS1)
ST2 Second carrier shaft (PS2)
i Gear ratio
DS Double shifting element

The invention claimed is:

1. A drive arrangement of a vehicle comprising:
a change-speed transmission with a transmission input shaft and a transmission output shaft,
the transmission being in a form of a three-gear transmission for engaging a first gear, a second gear and a third gear by a first shifting element, a second shifting element and a third shifting element,
first and second mutually coupled planetary gearsets,
the first planetary gearset comprising a first sun shaft, a first ring gear shaft and a first carrier shaft and the second planetary gearset comprising a second sun shaft, a second ring gear shaft and a second carrier shaft,
the first carrier shaft being permanently connected to the second ring gear shaft,
the first sun shaft being permanently connected to and forming the transmission input shaft,
the second sun shaft being permanently secured to a housing,
the second carrier shaft being permanently connected to and forming the transmission output shaft such that rotation of the second sun shaft relative to the transmission output shaft is prevented, and
the first shifting element being actuatable to engage the first gear,
the second shifting element being actuatable to engage the second gear and the third shifting element being actuatable to engage the third gear.

2. The drive arrangement according to claim 1, wherein the first ring gear shaft is couplable to the housing by actuating only the first shifting element.

3. The drive arrangement according to claim 1, wherein the first ring gear shaft is couplable to the second carrier shaft by the second shifting element.

4. The drive arrangement according to claim 1, wherein the first planetary gearset is blocked by engagement of only the third shifting element, whereby either
the first ring gear shaft is couplable to the first sun shaft and the transmission input shaft such that relative rotation between the first ring gear shaft, the first sun shaft and the transmission input shaft is prevented, or
the first ring gear shaft is couplable to the first carrier shaft such that relative rotation between the first ring gear shaft and the first carrier shaft is prevented.

5. The drive arrangement according to claim 1, wherein the first, the second and the third shifting elements are in a form of disk clutches.

6. The drive arrangement according to claim 1, wherein the first, the second and the third shifting elements are in a form of unsynchronized claw clutches.

7. The drive arrangement according to claim 6, wherein at least one of the first, the second and the third shifting elements is in the form of a triple shifting element, such that the first, the second and the third shifting elements are actuatable by a sliding sleeve and the sliding sleeve is arranged and movable on the first ring gear shaft.

8. The drive arrangement according to claim 1, wherein the first and the second shifting elements are in a form of claw clutches and the third shifting element is in a form of a disk clutch.

9. The drive arrangement according to claim 8, wherein the first and the second shifting elements are combined as a double shifting element.

10. The drive arrangement according to claim 1, wherein the first, the second and the third shifting elements are individual shifting elements.

11. A method of carrying out shifts under load by first, second and third shifting elements of a change-speed transmission having a transmission input shaft and a transmission output shaft, the change-speed transmission being a three-gear transmission for engaging a first gear, a second gear and a third gear by the first shifting element, the second shifting element and the third shifting element, and the change-speed transmission further having first and second mutually coupled planetary gearsets, the first planetary gearset having a first sun shaft, a first ring gear shaft and a first carrier shaft, and the second planetary gearset having a second sun shaft, a second ring gear shaft and a second carrier shaft, the first carrier shaft being permanently connected to the second ring gear shaft, the first sun shaft being permanently connected to and forming the transmission input shaft, the second sun shaft being permanently secured to a housing, the second carrier shaft being permanently connected to and forming the transmission output shaft, the first shifting element being actuatable to engage the first gear, the second shifting element being actuatable to engage the second gear and the third shifting element being actuatable to engage the third gear, the method facilitating an upshift, under traction, from the first gear to the second gear, the method comprising:
initiating the upshift from the first gear in which the first shifting element is engaged and the second and the third shifting elements are disengaged,
engaging the third shifting element with slip until the first shifting element becomes free from load and is disengaged,
subsequently further engaging the third shifting element until the second shifting element is synchronized and is engagable, and
disengaging the third shifting element again.

12. The method of carrying out shifts according to claim 11, further comprising:
initiating an upshift, under traction, from the second gear, in which the second shifting element is engaged and the first and the third shifting elements are disengaged, to the third gear, engaging the third shifting element with slip until the second shifting element becomes free from load and is disengaged, and subsequently completely engaging the third shifting element.

13. The method of carrying out shifts according to claim 11, wherein if a double shifting element is used, a disengaged position of the first shifting element and a disengaged position of the second shifting element is a neutral position of the double shifting element.

14. The method of carrying out shifts according to claim 11, further comprising carrying out actuation by electric motor-actuated ball ramps.

* * * * *